United States Patent [19]
Koch et al.

[11] Patent Number: 5,776,844
[45] Date of Patent: Jul. 7, 1998

[54] COMPOSITIONS OF SILICO-SODO-CALCIC GLASSES AND THEIR APPLICATIONS

[75] Inventors: Stephanie Koch, Mountain View, Calif.; Didier Jousse, Leu-la-Foret, France; Rene Gy, Bondy, France; Gilles Courtemanche, Paris, France

[73] Assignee: Saint-Gobain Vitrage, Courbevoie, France

[21] Appl. No.: 646,337
[22] PCT Filed: Oct. 13, 1995
[86] PCT No.: PCT/FR95/01347
  § 371 Date: Dec. 13, 1996
  § 102(e) Date: Dec. 13, 1996
[87] PCT Pub. No.: WO96/11887
  PCT Pub. Date: Apr. 25, 1996

[30] Foreign Application Priority Data

Oct. 13, 1994 [FR] France ................... 94 12210
Nov. 30, 1994 [FR] France ................... 94 14352

[51] Int. Cl.$^6$ ................................ C03C 3/087
[52] U.S. Cl. ................ 501/70; 501/69; 501/72
[58] Field of Search ................ 501/67, 70, 68, 501/69, 72

[56] References Cited

U.S. PATENT DOCUMENTS

| | | | |
|---|---|---|---|
| 4,015,966 | 4/1977 | Weaver. | |
| 4,994,415 | 2/1991 | Imai et al. | 501/66 |
| 5,374,595 | 12/1994 | Dumbaugh, Jr. et al. | 501/66 |
| 5,489,558 | 2/1996 | Moffatt et al. | 501/69 |
| 5,508,237 | 4/1996 | Moffatt et al. | 501/69 |
| 5,599,754 | 2/1997 | Maeda et al. | 501/70 |
| 5,618,763 | 4/1997 | Frank et al. | 501/5 |
| 5,631,195 | 5/1997 | Yanagisawa et al. | 501/72 |
| 5,656,558 | 8/1997 | Brix et al. | 501/70 |
| 5,656,559 | 8/1997 | Combes et al. | 501/70 |

FOREIGN PATENT DOCUMENTS

| | | |
|---|---|---|
| 131399 | 1/1985 | European Pat. Off. . |
| 592237 | 4/1994 | European Pat. Off. . |
| 3-40933 | 3/1991 | Japan . |
| 975618 | 11/1982 | U.S.S.R. . |
| 998401 | 2/1983 | U.S.S.R. . |

OTHER PUBLICATIONS

Chemical Abstracts, vol. 98, No. 18, abstract No. 148473a, Mkrtchyan et al., p. 309, May 2, 1983.

Chemical Abstracts, vol. 99, No. 2, abstract No. 9786h, Nikulin et al., p. 240, Jul. 11, 1983.

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

This invention concerns a thermally stable glass composition, which comprises the following constituents in the following proportions by weight:

| | |
|---|---|
| $SiO_2$ | 45 to 68% |
| $Al_2O_3$ | 0 to 20% |
| $ZrO_2$ | 0 to 20% |
| $B_2O_3$ | 0 to 10% |
| $Na_2O$ | 2 to 12% |
| $K_2O$ | 3.5 to 9% |
| CaO | 1 to 13% |
| MgO | 0 to 8% | the sum of the contents of the oxides $SiO_2$, $Al_2O_3$ and $ZrO_2$ remaining equal to or less than 70%, the sum of the oxides $Al_2O_3$ and $ZrO_2$ being equal to or greater than 2%, the sum of the alkaline oxides $Na_2O$ and $K_2O$ being equal to or greater than 8%, said composition comprising, if desired, the oxides BaO and/or SrO in proportions such that:

$$11\% \leq MgO+CaO+BaO+SrO < 30\%$$

This glass composition may be used for the production of substrates for an emissive screen or for that of a fire-resistant pane.

12 Claims, No Drawings

COMPOSITIONS OF SILICO-SODO-CALCIC GLASSES AND THEIR APPLICATIONS

This invention has as its subject glass compositions suitable for being converted into glass ribbon, from which can be cut plates that are highly resistant to heat. These plates may be used for the production of fire-resistant panes or may serve as substrates for the production of plasma screens, electroluminescent screens and cold cathode screens (field-emission displays).

The glass at present used for the production of such substrates is a glass belonging to the family of the silico-sodo-calcic glasses, commonly used for the production of panes intended for buildings or automobile vehicles. Although this type of glass is thoroughly satisfactory with regard to its chemical resistance, planeity and the defects that it does have, its temperature behaviour sometimes leaves something to be desired.

In the production of emissive screens, the substrate is subjected to several thermal treatments which are intended for stabilizing the dimensions of said substrate and fixing a series of films of different compounds, such as enamels, deposited on its surface. The fixing of these films of more or less large thicknesses requires that the temperature of the substrate be raised to values higher than 550° C. Although the coefficient of thermal expansion of the silico-sodo-calcic glass used may be of the same order of value as that of the compounds deposited on its surface, its temperature behaviour is inadequate and it must be supported on a trued plate during the thermal treatments to prevent any deformation.

The glasses used for the manufacture of fire-resistant panes generally belong to the family of the borosilicate glasses. These glasses, which have very good heat resistance and thermal shock resistance are characterized generally by a low coefficient of thermal expansion. This latter characteristic does not allow high stresses to be developed in these glasses by thermal toughening and the increase of their mechanical strength by this means is accordingly limited.

The present invention proposes to overcome the limitations that the use of these known glasses imposes for one or another of the applications indicated above.

Thus, the present invention has as its subject a glass composition enabling a plate or a substrate to be produced, the deformation of which is virtually zero when it is subjected to temperatures between 550° and 600° C.

The present invention has as its subject, notably, a glass composition enabling a plate to be produced, within which stresses at least as high as those that develop in a plate of ordinary silico-sodo-calcic glass can become established by thermal toughening.

The present invention has as its subject a glass composition enabling a substrate to be produced, in which the surface depletion of alkaline ions shall be less than that observed on a substrate produced from an ordinary silico-sodo-calcic glass.

The present invention also has as its subject a glass composition capable of being melted and converted into a ribbon of float glass on a molten metal bath in temperature conditions close to those of an ordinary silico-sodo-calcic glass.

These objectives are attained by means of a glass composition which comprises the following constituents, in the following proportions by weight:

| | |
|---|---|
| $SiO_2$ | 45 to 68% |
| $Al_2O_3$ | 0 to 20% |
| $ZrO_2$ | 0 to 20% |
| $B_2O_3$ | 0 to 10% |
| $Na_2O$ | 2 to 12% |
| $K_2O$ | 3.5 to 9% |
| CaO | 1 to 13% |
| MgO | 0 to 8% | the sum of the contents of the oxides $SiO_2$, $Al_2O_3$ and $ZrO_2$ remaining equal to or less than 70%, the sum of the oxides $Al_2O_3$ and $ZrO_2$ being equal to or greater than 2%, the sum of the contents of the alkaline oxides $Na_2O$ and $K_2O$ being equal to or greater than 8%, said composition comprising, if desired, the oxides BaO and/or SrO in proportions such that:

$$11\% \leq MgO+CaO+BaO+SrO \leq 30\%$$

said composition having a strain point equal to or greater than approximately 530° C. and a coefficient of expansion ($\alpha_{25°-300° C.}$) lying between 80 and 95×10$^{-7}$/°C.

It is commonly accepted that glass no longer has any viscous behaviour below a characteristic temperature termed the strain point, which corresponds to a viscosity of the order of 10$^{14.5}$ poises. For this reason, this temperature is an interesting reference point for evaluating the behaviour with temperature of a glass. As a result of the combination of the constituents as it results from the definition of this invention, the glasses complying with this definition possess a strain point higher by at least 25° C. approximately than that of a conventional silico-sodo-calcic glass. For the majority of the glasses according to the invention, this difference is at least 45° to 50° C.

This combination of constituents also enables glasses to be obtained, the coefficient of thermal expansion of which remains of the same order of value as that of a conventional silico-sodo-calcic glass.

The glasses according to this invention also have the advantage that it is possible to melt them and convert them into a glass ribbon at temperatures in the vicinity of those adopted for the production of a conventional silico-sodo-calcic glass.

In this respect, $SiO_2$ fulfils an essential role. In the context of the invention, the $SiO_2$ content must not exceed approximately 68%; above this value the melting of the vitrifiable mixture and the refining of the glass require high temperatures, which cause accelerated wear of the refractories of the furnaces. Moreover, it has been observed in the framework of this invention that an increase in the $SiO_2$ content does not favour a rise in the strain point of the glass. Below 45% by weight of $SiO_2$, the stability of the glasses according to the invention is insufficient. The glasses according to the invention, which most easily melt, the viscosities of which are best adapted to the floating of the glass on a bath of molten metals and which have the highest strain points, contain between 45 and 59% of $SiO_2$.

Alumina fulfils a stabilizing function. This oxide increases to a certain extent the chemical resistance of the glass and favours the raising of the strain point. The percentage of $Al_2O_3$ should not exceed 20%, since otherwise there is a risk that melting may be made too difficult and that the viscosity of the glass at high temperatures may be increased to an unacceptable extent.

$ZrO_2$ also fulfils a stabilizing role. This oxide increases, to a certain extent, the chemical resistance of the glass and promotes a rise in the strain point. The percentage of $ZrO_2$ should not exceed 20% since otherwise there is a risk that melting may be made too difficult. If this oxide is difficult to melt, it does have the advantage of not increasing the viscosity of the glasses according to this invention at high temperatures. This makes it possible to avoid the introduction, into these glasses, of oxides such as $B_2O_3$, one of the effects of which is to reduce the viscosity of the glass, or to avoid increasing the content of alkaline oxides, which have the same effect.

Overall, the melting of the glasses according to this invention remains within acceptable temperature limits, provided that the sun of the contents of the oxides $SiO_2$, $Al_2O_3$ and $ZrO_2$ remains equal to or less than 70%. The term acceptable limits is to be understood as meaning that the temperature of the glass corresponding to $\log\eta 1.6$ does not exceed approximately 1.630° C. and preferably 1.590° C.

Among the glasses of the present invention, some contain alumina and, possibly also, zirconia, and others contain zirconia, and possibly alumina. To distinguish these in the remainder of the description, the former will be termed aluminous and the latter zirconiferous.

The glasses termed aluminous contain the following constituents in the following proportions by weight:

| | |
|---|---|
| $SiO_2$ | 45 to 68% |
| $Al_2O_3$ | 2 to 20% |
| $ZrO_2$ | 0 to 20% |
| $B_2O_3$ | 0.5 to 4% |
| $Na_2O$ | 4 to 11% |
| $K_2O$ | 3.5 to 7% |
| CaO | 1 to 13% |
| MgO | 1 to 8% | the sum of the contents of the oxides $SiO_2$, $Al_2O_3$ and $ZrO_2$ remaining equal to or less than 70%, the sum of the contents of the alkaline oxides $Na_2O$ and $K_2O$ being equal to or higher than 8%, said composition containing, possibly also, the oxides BaO and/or SrO in proportions such that:

$$11\% \leq MgO+CaO+BaO+SrO \leq 24\%$$

This family of glasses is distinguished, notably by the systematic presence of $B_2O_3$. In fact this oxide, as lattice-forming oxide, may be added to or may replace $SiO_2$. It lowers the fusion point of the vitrifiable mixture as well as the viscosity of the glasses at high temperatures. It also reduces the tendency of the glass to devitrify, and in particular it enables a rise in the liquidus temperature to be prevented. This effect, combined with the lowering of the viscosity, enables a sufficient difference to be maintained between the moulding temperature of the glass and its liquidus temperature. In float glass technology, in particular, it is important for the liquidus temperature of the glass to remain equal to or lower than the temperature corresponding to $\log\eta=3.5$, which is the case with the glasses according to this invention. More specifically, the glasses according to the invention have a temperature corresponding to $\log\eta=3.5$ that is equal to or lower than approximately 1.220° C. and preferably 1.170° C.

The $B_2O_3$ content does not exceed approximately 4% because, above this value, the volatilization of boron in the presence of alkaline oxides during the production of the glass can become significant. In this family of glasses according to the invention, the sum of the contents of the oxides $Al_2O_3$ and $ZrO_2$ is advantageously equal to or greater than 5%. The sum of the contents of these oxides is, preferably, between 8 and 22%.

The preferred compositions of aluminous glass according to the invention comprise the constituents given below in the following proportions by weight:

| | |
|---|---|
| $SiO_2$ | 45 to 59% |
| $Al_2O_3$ | 5 to 18% |
| $ZrO_2$ | 0 to 17% |
| $B_2O_3$ | 0.5 to 4% |
| $Na_2O$ | 4 to 10% |
| $K_2O$ | 3.5 to 7% |
| CaO | 1 to 12% |
| MgO | 1 to 7% | the sum of the contents of the oxides $SiO_2$, $Al_2O_3$ and $ZrO_2$ remaining lower than or equal to 70%, the sum of the contents of the alkaline oxides being equal to or greater than 10%, said compositions comprising, if desired, the oxides BaO and/or SrO in proportions such that:

$$14\% \leq MgO+CaO+BaO+SrO \leq 22\%$$

said glass compositions having a strain point equal to or higher than 550° C. and a coefficient of thermal expansion ($\alpha_{25°-300°\ C.}$) lying between 85 and $95\times10^{-7}$/°C.

The glasses termed zirconiferous comprise the constituents listed below in the following proportions by weight:

| | |
|---|---|
| $SiO_2$ | 45 to 63% |
| $ZrO_2$ | 6.5 to 20% |
| $Al_2O_3$ | 0 to 18% |
| $Na_2O$ | 4 to 12% |
| $K_2O$ | 3.5 to 7% |
| CaO | 1 to 13% |
| MgO | 1 to 8% | the sum of the contents of the oxides $SiO_2$, $ZrO_2$ and $Al_2O_3$ remaining equal to or less than 70%, the sum of the contents of the alkaline oxides $Na_2O$ and $K_2O$ being equal to or greater than 8%, said composition containing, if desired, the oxides BaO and/or SrO in proportions such that $$11\% \leq MgO+CaO+BaO+SrO \leq 24\%$$

said composition having a strain point equal to or higher than approximately 530° C. and a coefficient of thermal expansion ($\alpha_{25°-300°\ C.}$) lying between 80 and $95\times10^{-7}$/°C.

In this family of glasses the $SiO_2$ content is a function of the presence of other oxides that are also difficult to melt, such as $ZrO_2$ and, if applicable, $Al_2O_3$. Thus their maximum $SiO_2$ content must not exceed approximately 63%: above this, the melting of the vitrifiable mixture and the refining of the glass require high temperatures, which cause accelerated wear of the refractories of the furnaces. Furthermore, it has been observed within the framework of this invention that an increase in the $SiO_2$ content does not promote the raising of the strain point of the glass. Below 45% by weight of $SiO_2$, the stability of the glasses according to the invention is insufficient.

The zirconiferous glasses according to this invention, which are most easy to melt, the viscosities of which are best adapted for floating of the glass on a bath of molten metal, and which have the highest strain points, contain between 45 and 59% of $SiO_2$.

As for the aluminous glasses, it has been established that the melting of the zirconiferous glasses remains within acceptable temperature limits provided that the sum of the oxides $SiO_2$, $Al_2O_3$ and $ZrO_2$ remains equal to or less than 70%. The term acceptable limits should be understood to mean that the temperature of the glass corresponding to $\log\eta=1.6$ does not exceed approximately 1,630° C. and preferably 1,590° C.

In the zirconiferous glasses according to the invention, the sum of the $Al_2O_3$ and $ZrO_2$ oxides is advantageously equal to or greater than 8%, and preferably between 8 and 22%. Their $ZrO_2$ content is advantageously between 8 and 15%.

These zirconiferous glasses are distinguished, in particular, from the aluminous glasses according to the invention by the absence of boron because, in contrast to $Al_2O_3$, the presence of even a high content of $ZrO_2$ in the glasses of the invention does not have the effect of increasing their viscosity at high temperatures.

The zirconiferous glasses according to the invention also have the advantage of being well adapted to the techniques of melting associated with the procedure of floating the glass on a bath of molten metal. In facts it has been found that these glasses result in a low corrosion of the refractories, of the AZS (alumina-zirconia-silica) type, commonly used in this type of furnace. These glasses thus guarantee an optimization of the useful life of the furnace.

The preferred compositions of zirconiferous glasses according to the invention contain the constituents listed below in the following proportions by weight:

| | |
|---|---|
| $SiO_2$ | 45 to 59% |
| $ZrO_2$ | 8 to 15% |
| $Al_2O_3$ | 0 to 10% |
| $Na_2O$ | 4 to 10% |
| $K_2O$ | 3.5 to 7% |
| CaO | 1 to 12% |
| MgO | 1 to 7% | the sum of the contents of the oxides $SiO_2$, $Al_2O_3$ and $ZrO_2$ remaining less than or equal to 70%, the sum of the contents of the alkaline oxides being equal to or greater than 10%, said compositions comprising, perhaps also, the oxides BaO and/or SrO in proportions such that:

$$14\% \leq MgO+CaO+BaO+SrO \leq 22\%$$

said glass compositions having a strain point equal to or higher than 550° C. and a coefficient of thermal expansion ($\alpha_{25°-300° C.}$) lying between 82 and $95\times10^{-7}$/°C.

Generally speaking, the influence of the other oxides upon the suitability of the glasses according to the invention to be melted and floated on a metal bath, as well as upon their properties, is as follows:

The oxides $Na_2O$ and $K_2O$ enable the fusion temperatures of the glasses according to the invention and their viscosities at high temperatures to be maintained within the limits indicated above. To achieve this, the sum of the contents of these oxides remains equal to or higher than approximately 8%. By comparison with an ordinary silico-sodo-calcic glass the simultaneous presence of these two oxides in the glasses according to the invention, sometimes in closely adjacent proportions, enables their chemical resistance, more precisely their hydrolytic resistance, and also their resistivity to be considerably increased. The increase in the resistivity of the glasses is advantageous in certain applications, more precisely when they are used as a substrate for cold cathode ray screens (field emission displays). In these screens, surface electrical fields originate, which cause a localized concentration of electrons. This concentration may cause an undesirable migration reaction of the alkalines if the resistivity of the glass is inadequate, as in the case of an ordinary silico-sodo-calcic glass.

The alkaline earth oxides introduced into the glasses according to the invention have the overall effect of raising the strain point, and this is the reason why the sum of their contents by weight must be at least 11%. Above approximately 30%, the tendency of the glasses to devitrify can increase in proportions that are incompatible with the float procedure on a metal bath. In order to maintain the devitrification of the glasses within acceptable limits, their contents by weight of CaO and MgO must not exceed, respectively, 13 and 8%. The MgO content is, preferably, equal to or less than 5%.

MgO, CaO and to a lesser extent SrO enable the strain point to be raised; BaO and SrO enable the chemical resistance of the glasses according to the invention and also their resistivity to be increased. BaO also has the effect of lowering the melting temperature and also the viscosity of the glasses at high temperatures.

The advantages offered by the glass compositions according to the invention will be better appreciated from the examples summarized in the annexed tables 1 and 2.

Glass no. 1 corresponds to a conventional silico-sodo-calcic glass composition used for the production of a glass ribbon by the process of float glass on a molten metal bath; glass no. 2 corresponds to a known borosilicate glass. Glasses nos. 3 to 13 illustrate the glass compositions according to the invention. The strain point $T_1$, the coefficient of thermal expansion, the viscosities and the liquidus temperature as well as the hydrolytic resistance (DGG) and the resistivity were measured by methods well known to the person skilled in the art.

As the examples demonstrate, the viscosity and liquidus characteristics of the glasses according to the invention are sufficiently close to those of the reference glass for them to be produced and transformed into a ribbon under virtually the same conditions as the latter.

Thus, by the float glass technique, the glasses according to the invention are produced in the form of a ribbon of strictly controlled thickness, which may vary from 0.5 m to 10 mm. Sheets are cut to the desired format from said ribbon before being subjected to a thermal treatment having the objective of stabilizing the dimensions of said sheets. These sheets are then ready to serve as substrate which will accept the deposition of different films and the thermal treatments that their fixing requires.

These sheets or plates, having been subjected to thermal toughening, may be incorporated into insulating glazing panes or into laminated panes. These insulating panes are constituted of plates associated in pairs by means of a bonded intermediate profile and the technique for mounting them in the frame that supports them is such that, when they are exposed to flames, the edge of the plate on the fire side is exposed instantaneously or, in any case, after a brief delay, to the thermal radiation and to the flames themselves, which makes it possible to limit the thermal stresses that commonly become established in a plate when it is heated more at its centre than at its edges. The association of a thermal toughening of good quality and of the mounting assembly in question allows such a pane to remain in place for a sufficient time to satisfy the standards in force.

The laminated panes are produced by the association of plates by means of an intermediate plastics film; in general, the glass plates used are also thermally toughened.

TABLE 1

|  | No 1 | No 2 | No 3 | No 4 | No 5 | No 6 | No 7 | No 8 |
|---|---|---|---|---|---|---|---|---|
| $SiO_2$ | 71,7 | 81,0 | 60,9 | 66,6 | 53,6 | 46,9 | 51,1 | 48,5 |
| $Al_2O_3$ | 0,6 | 2,2 | 5,7 | 3,0 | 10,0 | 18,0 | 12,0 | 14,8 |
| $ZrO_2$ |  |  |  |  | 2,0 |  | 1,9 | 2,0 |
| $B_2O_3$ |  | 13 | 3,5 | 3,4 | 2,2 | 3,5 | 1,7 | 2,3 |
| $Na_2O$ | 13,9 | 3,6 | 5,5 | 9,6 | 5,2 | 4,7 | 4,7 | 5,3 |
| $K_2O$ |  | 0,2 | 6,2 | 4,1 | 6,2 | 6,2 | 6,8 | 6,5 |
| MgO | 4,1 |  | 4,2 | 6,7 | 4,2 | 3,0 | 3,7 | 3,8 |
| CaO | 9,5 |  | 6,8 | 6,6 | 6,8 | 7,5 | 6,8 | 6,6 |
| SrO |  |  | 4,4 |  | 7,0 | 7,2 | 7,6 | 7,0 |
| BaO |  |  | 2,8 |  | 2,8 | 3,0 | 3,7 | 3,2 |
| $T_1$ (°C.) | 507 | 510 | 540 | 531 | 580 | 579 | 577 | 582 |
| T(logη = 7,6) (°C.) | 725 | 821 |  |  |  |  |  | 830 |
| α (× 10⁻⁷/ °C.) | 88,5 | 32 | 84,5 | 80,5 | 84,0 | 86,0 | 88,5 | 88,0 |
| Log ρ (Ω·cm) (at 250° C.) | 6,6 |  |  |  |  |  |  | 8,7 |
| D.G.G. (mg) | 30 |  |  |  | 7 |  |  |  |
| T(logη = 1,6) (°C.) | 1550 | >1800 | 1566 | 1579 | 1584 | 1559 | 1554 | 1546 |
| T(logη = 3,5) (°C.) | 1085 |  | 1113 | 1119 | 1156 | 1160 | 1159 | 1162 |
| $T_{liquidus}$ (°C.) | 1020 |  | 1060 | 1110 | 1120 | 1100 | 1120 | 1120 |

TABLE 2

|  | No 1 | No 2 | No 9 | No 10* | No 11* | No 12* | No 13* |
|---|---|---|---|---|---|---|---|
| $SiO_2$ | 71,7 | 81,0 | 54,6 | 52,0 | 53,05 | 52 | 52 |
| $Al_2O_3$ | 0,6 | 2,2 | 3,0 | 4,0 | 3,25 | 2 | 5,0 |
| $ZrO_2$ |  |  | 10,0 | 11,0 | 9,25 | 5 | 4 |
| $B_2O_3$ |  | 13 |  |  |  |  |  |
| $Na_2O$ | 13,9 | 3,6 | 6,0 | 7,0 | 4,25 | 4,0 | 5,0 |
| $K_2O$ |  | 0,2 | 6,9 | 5,0 | 6,05 | 8,0 | 6,0 |
| MgO | 4,1 |  | 4,2 | 7,0 | 2,05 | 4,0 | 5,0 |
| CaO | 9,5 |  | 3,5 | 9,0 | 7,2 | 8,0 | 10,0 |
| SrO |  |  | 8,0 | 3,0 | 9,15 | 9,0 | 7,0 |
| BaO |  |  | 3,8 | 2,0 | 5,75 | 8,0 | 6,0 |
| $T_1$ (°C.) | 507 | 510 | 606 | 600 | 612 | 574 | 575 |
| T(logη = 7,6) (°C.) | 725 | 821 |  |  |  |  |  |
| α (× 10⁻⁷/ °C.) | 88,5 | 32 | 81,5 | 84 | 81,5 | 93,5 | 91,3 |
| Log ρ (Ω·cm) (at 250° C.) | 6,6 |  | 9,7 | 9,65 | 10,7 | 11,3 | 10,7 |
| D.G.G. (mg) | 30 |  |  |  |  |  |  |
| T(logη = 1,6) (°C.) | 1550 | >1800 | 1554 | 1450 | 1539 | 1413 | 1415 |
| T(logη = 3,5) (°C.) | 1085 |  | 1192 | 1220 | 1172 | 1078 | 1072 |
| $T_{liquidus}$ (°C.) | 1020 |  |  | 1360 | 1120 |  |  |

*No. 10 to 13 - Theoretical compositions

We claim:

1. A glass composition consisting essentially of the following constituents in the following proportions by weight:

| $SiO_2$ | 45 to 63% |
|---|---|
| $ZrO_2$ | 6.5 to 20% |
| $Al_2O_3$ | 0 to 18% |
| $Na_2O$ | 4 to 12% |
| $K_2O$ | 3.5 to 7% |
| CaO | 1 to 13% |
| MgO | 0 to 8% | wherein the sum of $SiO_2$, $ZrO_2$ and $Al_2O$ is equal to or less than 70%, the sum of $Na_2O$ and $K_2O$ is equal to or greater than 8%, said composition containing, optionally, the oxides BaO and/or SrO in proportions such that:

$$11\% \leq MgO+CaO+BaO+SrO \leq 24\%$$

said composition has a strain point equal to or greater than approximately 530° C. and a coefficient of thermal expansion (α25°–300° C.) between 80 and 95×10⁻⁷/°C.

2. The glass composition according to claim 1, wherein the sum of $Al_2O_3$ and $ZrO_2$ is equal to or greater than 8%.

3. The glass composition according to claim 2, wherein the sum of $Al_2O_3$ and $ZrO_2$ is between 8 and 22%.

4. The glass composition according to claim 1, wherein the amount of $ZrO_2$ is from 8 to 15%.

5. The glass composition according to claim 1, wherein the amount of $SiO_2$ is from 45 to 59%.

6. The glass composition according to claim 1, consisting essentially of the following constituents in the following proportions by weight:

| $SiO_2$ | 45 to 59% |
|---|---|
| $ZrO_2$ | 8 to 15% |
| $Al_2O_3$ | 0 to 10% |
| $Na_2O$ | 4 to 10% |
| $K_2O$ | 3.5 to 7% |
| CaO | 1 to 12% |
| MgO | 1 to 7% | wherein the sum of $Na_2O$ and $K_2O$ is equal to or greater than 10%, said composition optionally containing also the oxides BaO and/or SrO in proportions such that:

$$14\% \leq MgO+CaO+BaO+SrO \leq 22\%$$

said composition has a strain point equal to or greater than approximately 550° C. and a coefficient of thermal expansion (α25°–300° C.) between 85 and 95×10⁻⁷/°C.

7. The glass composition according to claim 1, wherein said glass composition has a viscosity corresponding to logη=1.6 at a temperature equal to or less than 1,630° C.

8. The glass composition according to claim 1, wherein said glass composition has a viscosity composition to logη= 1.6 at a temperature equal to or less than 1,590° C.

9. The glass composition according to claim 1, wherein said glass composition has a viscosity corresponding to logη=3.5 at a temperature equal to or less than 1,220° C.

10. The glass composition according to claim 1, wherein said glass composition has a viscosity corresponding to logη=1.6 at a temperature equal to or less than 1,590° C.

11. The glass composition according to claim 9, having a liquidus temperature less than or equal to the temperature corresponding to the viscosity logη=3.5.

12. The glass composition of claim 1, in the form of a glass sheet.

* * * * *